United States Patent
Oberheide et al.

(10) Patent No.: US 9,996,343 B2
(45) Date of Patent: *Jun. 12, 2018

(54) SYSTEM AND METHOD FOR DETERMINING COMPONENT VERSION COMPATIBILITY ACROSS A DEVICE ECOSYSTEM

(71) Applicant: Duo Security, Inc., Ann Arbor, MI (US)

(72) Inventors: Jon Oberheide, Ann Arbor, MI (US); Douglas Song, Ann Arbor, MI (US)

(73) Assignee: Duo Security, Inc., Ann Arbor, MI (US)

( * ) Notice: Subject to any disclaimer, the term of this patent is extended or adjusted under 35 U.S.C. 154(b) by 10 days.

This patent is subject to a terminal disclaimer.

(21) Appl. No.: 15/152,916

(22) Filed: May 12, 2016

(65) Prior Publication Data

US 2016/0259640 A1     Sep. 8, 2016

Related U.S. Application Data

(63) Continuation of application No. 14/743,783, filed on Jun. 18, 2015, now Pat. No. 9,454,365, which is a continuation of application No. 14/482,796, filed on Sep. 10, 2014, now Pat. No. 9,092,302.

(60) Provisional application No. 61/876,109, filed on Sep. 10, 2013.

(51) Int. Cl.
  *G06F 9/44*    (2006.01)
  *G06F 17/30*   (2006.01)
  *G06F 9/445*   (2018.01)

(52) U.S. Cl.
  CPC ............ *G06F 8/71* (2013.01); *G06F 9/44505* (2013.01); *G06F 17/30477* (2013.01); *G06F 8/65* (2013.01)

(58) Field of Classification Search
  CPC ........ G06F 8/65; G06F 17/30477; G06F 8/71; G06F 9/44505
  USPC ......................................................... 717/122
  See application file for complete search history.

(56) References Cited

U.S. PATENT DOCUMENTS

| | | |
|---|---|---|
| 5,838,792 A | 11/1998 | Ganesan |
| 5,870,723 A | 2/1999 | Pare et al. |
| 6,119,096 A | 9/2000 | Mann et al. |
| 6,209,091 B1 | 3/2001 | Sudia et al. |
| 6,311,272 B1 | 10/2001 | Gressel |
| 6,694,025 B1 | 2/2004 | Epstein et al. |
| 6,758,394 B2 | 7/2004 | Maskatiya et al. |
| 6,823,359 B1 | 11/2004 | Heidingsfeld et al. |
| 6,934,858 B2 | 8/2005 | Woodhill |
| 6,956,950 B2 | 10/2005 | Kausik |

(Continued)

OTHER PUBLICATIONS

Simske et al., "APEX: Automated Policy Enforcement eXchange", Sep. 21-24, 2010, ACM, pp. 139-142.

(Continued)

*Primary Examiner* — John Chavis
(74) *Attorney, Agent, or Firm* — Jeffrey Schox; Padowithz Alce

(57) ABSTRACT

A system and method that include collecting device version profiles from a plurality of device sources; classifying the device version profiles into a device profile repository; receiving a component version query request; querying the device profile repository according to the version query request; and responding to the query request with results of the query.

16 Claims, 9 Drawing Sheets

(56) References Cited

U.S. PATENT DOCUMENTS

| | | |
|---|---|---|
| 6,996,716 B1 | 2/2006 | Hsu |
| 7,096,354 B2 | 8/2006 | Wheeler et al. |
| 7,331,518 B2 | 2/2008 | Rable |
| 7,340,600 B1 | 3/2008 | Corella |
| 7,386,720 B2 | 6/2008 | Sandhu et al. |
| 7,447,784 B2 | 11/2008 | Eun |
| 7,463,637 B2 | 12/2008 | Bou-Diab et al. |
| 7,496,662 B1 | 2/2009 | Roesch et al. |
| 7,526,792 B2 | 4/2009 | Ross |
| 7,562,382 B2 | 7/2009 | Hinton et al. |
| 7,574,733 B2 | 8/2009 | Woodhill |
| 7,711,122 B2 | 5/2010 | Allen et al. |
| 7,793,110 B2 | 9/2010 | Durfee et al. |
| 7,904,608 B2* | 3/2011 | Price ............... G06F 8/65 710/10 |
| 7,953,979 B2 | 5/2011 | Borneman et al. |
| 7,982,595 B2 | 7/2011 | Hanna et al. |
| 8,028,329 B2 | 9/2011 | Whitcomb |
| 8,136,148 B1 | 3/2012 | Chayanam et al. |
| 8,161,527 B2 | 4/2012 | Curren |
| 8,200,980 B1 | 6/2012 | Robinson et al. |
| 8,245,044 B2 | 8/2012 | Kang |
| 8,332,627 B1 | 12/2012 | Matthews et al. |
| 8,335,933 B2 | 12/2012 | Humphrey et al. |
| 8,397,301 B2 | 3/2013 | Hering et al. |
| 8,402,526 B2 | 3/2013 | Ahn |
| 8,458,798 B2 | 6/2013 | Williams et al. |
| 8,495,720 B2 | 7/2013 | Counterman |
| 8,499,339 B2 | 7/2013 | Chao et al. |
| 8,510,820 B2 | 8/2013 | Oberheide et al. |
| 8,538,028 B2 | 9/2013 | Yeap et al. |
| 8,539,567 B1 | 9/2013 | Logue et al. |
| 8,549,601 B2 | 10/2013 | Ganesan |
| 8,595,809 B2 | 11/2013 | Chayanam et al. |
| 8,627,438 B1 | 1/2014 | Bhimanaik |
| 8,646,060 B1 | 2/2014 | Ben Ayed |
| 8,646,086 B2 | 2/2014 | Chakra et al. |
| 8,689,287 B2 | 4/2014 | Bohmer et al. |
| 8,700,729 B2 | 4/2014 | Dua |
| 8,732,475 B2 | 5/2014 | Fahrny et al. |
| 8,732,839 B2 | 5/2014 | Hohl |
| 8,745,703 B2 | 6/2014 | Lambert et al. |
| 8,763,077 B2 | 6/2014 | Oberheide et al. |
| 8,806,609 B2 | 8/2014 | Gladstone et al. |
| 8,850,516 B1 | 9/2014 | Hrebicek et al. |
| 8,891,772 B2 | 11/2014 | D Souza et al. |
| 8,893,230 B2 | 11/2014 | Oberheide et al. |
| 8,898,762 B2 | 11/2014 | Kang |
| 9,049,011 B1 | 6/2015 | Agrawal |
| 9,223,961 B1 | 12/2015 | Sokolov |
| 9,282,085 B2 | 3/2016 | Oberheide et al. |
| 9,391,980 B1 | 7/2016 | Krahn et al. |
| 2002/0013898 A1 | 1/2002 | Sudia et al. |
| 2002/0123967 A1 | 9/2002 | Wang |
| 2002/0131404 A1* | 9/2002 | Mehta ............... G06F 8/61 370/352 |
| 2002/0136410 A1 | 9/2002 | Hanna |
| 2003/0061506 A1 | 3/2003 | Cooper et al. |
| 2003/0115452 A1 | 6/2003 | Sandhu et al. |
| 2003/0120931 A1 | 6/2003 | Hopkins et al. |
| 2003/0126472 A1 | 7/2003 | Banzhof |
| 2003/0147536 A1 | 8/2003 | Andivahis et al. |
| 2004/0064706 A1 | 4/2004 | Lin et al. |
| 2004/0218763 A1 | 11/2004 | Rose et al. |
| 2005/0218215 A1 | 10/2005 | Lauden |
| 2005/0221268 A1 | 10/2005 | Chaar et al. |
| 2005/0240522 A1 | 10/2005 | Kranzley et al. |
| 2005/0268107 A1 | 12/2005 | Harris et al. |
| 2006/0031938 A1 | 2/2006 | Choi |
| 2006/0059569 A1 | 3/2006 | Dasgupta et al. |
| 2006/0130139 A1 | 6/2006 | Sobel et al. |
| 2006/0165060 A1 | 7/2006 | Dua |
| 2006/0182276 A1 | 8/2006 | Sandhu et al. |
| 2006/0184788 A1 | 8/2006 | Sandhu et al. |
| 2006/0242692 A1 | 10/2006 | Thione et al. |
| 2007/0016948 A1 | 1/2007 | Dubrovsky et al. |
| 2007/0081667 A1 | 4/2007 | Hwang |
| 2007/0156659 A1 | 7/2007 | Lim |
| 2007/0186106 A1 | 8/2007 | Ting et al. |
| 2007/0199060 A1 | 8/2007 | Touboul |
| 2007/0228148 A1 | 10/2007 | Rable |
| 2007/0250914 A1 | 10/2007 | Fazal |
| 2007/0258594 A1 | 11/2007 | Sandhu et al. |
| 2007/0284429 A1 | 12/2007 | Beeman |
| 2007/0297607 A1 | 12/2007 | Ogura et al. |
| 2008/0049642 A1 | 2/2008 | Gudipudi et al. |
| 2008/0069347 A1 | 3/2008 | Brown et al. |
| 2008/0120411 A1 | 5/2008 | Eberle |
| 2008/0229104 A1 | 9/2008 | Ju et al. |
| 2008/0301669 A1* | 12/2008 | Rao ............... G06F 8/65 717/173 |
| 2009/0055906 A1 | 2/2009 | Wendorff |
| 2009/0077060 A1 | 3/2009 | Sermersheim et al. |
| 2009/0167489 A1 | 7/2009 | Nan et al. |
| 2009/0187986 A1 | 7/2009 | Ozeki |
| 2009/0198997 A1 | 8/2009 | Yeap et al. |
| 2009/0210705 A1 | 8/2009 | Chen |
| 2009/0271863 A1 | 10/2009 | Govindavajhala et al. |
| 2009/0300596 A1 | 12/2009 | Tyhurst et al. |
| 2009/0300707 A1 | 12/2009 | Garimella et al. |
| 2010/0023781 A1 | 1/2010 | Nakamoto |
| 2010/0042954 A1 | 2/2010 | Rosenblatt et al. |
| 2010/0069104 A1 | 3/2010 | Neil et al. |
| 2010/0100725 A1 | 4/2010 | Ozzie et al. |
| 2010/0114740 A1 | 5/2010 | Dominguez et al. |
| 2010/0115578 A1 | 5/2010 | Nice et al. |
| 2010/0121767 A1 | 5/2010 | Coulter et al. |
| 2010/0125737 A1 | 5/2010 | Kang |
| 2010/0131755 A1 | 5/2010 | Zhu et al. |
| 2010/0180001 A1 | 7/2010 | Hardt |
| 2010/0202609 A1 | 8/2010 | Sandhu et al. |
| 2010/0216425 A1 | 8/2010 | Smith |
| 2010/0217986 A1 | 8/2010 | Schneider |
| 2010/0233996 A1 | 9/2010 | Herz et al. |
| 2010/0257610 A1 | 10/2010 | Hohl |
| 2010/0263021 A1 | 10/2010 | Arnott et al. |
| 2010/0274859 A1 | 10/2010 | Bucuk |
| 2010/0330969 A1 | 12/2010 | Kim et al. |
| 2011/0026716 A1 | 2/2011 | Tang et al. |
| 2011/0086616 A1 | 4/2011 | Brand et al. |
| 2011/0107389 A1 | 5/2011 | Chakarapani |
| 2011/0113484 A1 | 5/2011 | Zeuthen |
| 2011/0119765 A1 | 5/2011 | Hering et al. |
| 2011/0138469 A1 | 6/2011 | Ye et al. |
| 2011/0145900 A1 | 6/2011 | Chern |
| 2011/0197267 A1 | 8/2011 | Gravel et al. |
| 2011/0219449 A1 | 9/2011 | St. Neitzel et al. |
| 2011/0277025 A1 | 11/2011 | Counterman |
| 2011/0302410 A1 | 12/2011 | Clarke et al. |
| 2011/0302630 A1 | 12/2011 | Nair et al. |
| 2012/0063601 A1 | 3/2012 | Hart |
| 2012/0090028 A1 | 4/2012 | Lapsley et al. |
| 2012/0096274 A1 | 4/2012 | Campagna et al. |
| 2012/0198050 A1 | 8/2012 | Maki et al. |
| 2012/0198228 A1 | 8/2012 | Oberheide et al. |
| 2012/0216239 A1 | 8/2012 | Yadav et al. |
| 2012/0227098 A1 | 9/2012 | Obasanjo et al. |
| 2012/0290841 A1 | 11/2012 | Jentzsch |
| 2012/0300931 A1 | 11/2012 | Ollikainen et al. |
| 2013/0042002 A1 | 2/2013 | Cheeniyil et al. |
| 2013/0060708 A1 | 3/2013 | Oskolkov et al. |
| 2013/0081101 A1 | 3/2013 | Baer et al. |
| 2013/0097585 A1 | 4/2013 | Jentsch et al. |
| 2013/0110676 A1 | 5/2013 | Kobres |
| 2013/0117826 A1 | 5/2013 | Gordon et al. |
| 2013/0124292 A1 | 5/2013 | Juthani |
| 2013/0125226 A1 | 5/2013 | Shah et al. |
| 2013/0174246 A1 | 7/2013 | Schrecker et al. |
| 2013/0179681 A1 | 7/2013 | Benson et al. |
| 2013/0239167 A1 | 9/2013 | Sreenivas et al. |
| 2013/0239168 A1 | 9/2013 | Sreenivas et al. |
| 2013/0239177 A1 | 9/2013 | Sigurdson et al. |
| 2013/0246281 A1 | 9/2013 | Yamada et al. |
| 2013/0263211 A1 | 10/2013 | Neuman et al. |

(56) References Cited

U.S. PATENT DOCUMENTS

| | | |
|---|---|---|
| 2013/0310006 A1 | 11/2013 | Chen et al. |
| 2013/0326224 A1 | 12/2013 | Yavuz |
| 2013/0326493 A1 | 12/2013 | Poonamalli et al. |
| 2014/0019752 A1 | 1/2014 | Yin et al. |
| 2014/0047546 A1 | 2/2014 | Sidagni |
| 2014/0181517 A1 | 6/2014 | Alaranta et al. |
| 2014/0181520 A1 | 6/2014 | Wendling et al. |
| 2014/0188796 A1 | 7/2014 | Fushman et al. |
| 2014/0201841 A1 | 7/2014 | Deshpande et al. |
| 2014/0208405 A1 | 7/2014 | Hashai |
| 2014/0235230 A1 | 8/2014 | Raleigh |
| 2014/0237236 A1 | 8/2014 | Kalinichenko et al. |
| 2014/0244993 A1 | 8/2014 | Chew |
| 2014/0245278 A1 | 8/2014 | Zellen |
| 2014/0245396 A1 | 8/2014 | Oberheide et al. |
| 2014/0247140 A1 | 9/2014 | Proud |
| 2014/0351954 A1 | 11/2014 | Brownell et al. |
| 2014/0376543 A1 | 12/2014 | Malatack et al. |
| 2015/0012914 A1 | 1/2015 | Klein et al. |
| 2015/0026461 A1 | 1/2015 | Devi |
| 2015/0133094 A1* | 5/2015 | Lindeman ............. H04W 4/001 455/414.1 |
| 2015/0237026 A1 | 8/2015 | Kumar |
| 2015/0242643 A1 | 8/2015 | Hankins et al. |
| 2016/0056962 A1 | 2/2016 | Mehtala |
| 2016/0164866 A1 | 6/2016 | Oberheide et al. |
| 2016/0180072 A1 | 6/2016 | Ligatti et al. |
| 2016/0286391 A1 | 9/2016 | Khan |
| 2016/0366589 A1 | 12/2016 | Jean |
| 2017/0039242 A1* | 2/2017 | Milton ............... G06Q 30/0269 |
| 2017/0169066 A1* | 6/2017 | Mantri ............. G06F 17/30362 |

OTHER PUBLICATIONS

Symantec, Administration Guide for Symantec TM Endpoint Protection and Symantec Network Access Control, Aug. 1, 2007.

Symantec, Administration guide for symantec Endpoint protection and symantec network access control, 2009, version 11.00.05.00.00.

Edge, Kenneth, et al. "The use of attack and protection trees to analyze security for an online banking system." System Sciences, 2007. HICSS 2007. 40th Annual Hawaii International Conference on. IEEE, 2007.

Neuenhofen, Kay, and Mathew Thompson. "A secure marketplace for mobile java agents." Proceeding of the second international Conference on Autonomous agents. ACM, 1998. (pp. 212-218).

Aloul S Zahidi; et al. "Two factor authentication using mobile phones," 2009 IEEE/ACS International Conference on Computer Systems and Applications, Rabat, 2009, pp. 641-644.

Bonneau Joseph; et al. "Passwords and the evolution of imperfect authentication." Communications of the ACM 58.7 (2015): 78-87.

Kher Vishal; et al. "Securing distributed storage: challenges, techniques and systems." Proceedings of the 2005 ACM workshop on Storage security and survivability. ACM, 2005, pp. 9-25.

* cited by examiner

| Date | Device ID | OS Version | Recommended OS |
|---|---|---|---|
| Sep-2013 | 7f2e2 | 10.8.4 | 10.8.4 |
| | 3j302 | 10.8.2 | 10.8.4 |
| | mdo20 | 10.8.4 | 10.8.4 |
| | qis93 | 10.8.4 | 10.8.4 |
| | j2jd9 | 10.8.3 | 10.8.4 |
| | dnxo2 | 10.8.4 | 10.8.4 |
| | 2inc0 | 10.8.1 | 10.8.4 |
| | 5ishg | 10.7.5 | 10.8.4 |
| | jdit2 | 10.8.4 | 10.8.4 |
| | a374a | 10.8.4 | 10.8.4 |
| Oct-2014 | 5c9539 | 10.8.4 | 10.8.4 |
| | 1ece4 | 10.9.0 | 10.8.4 |
| | 5673a | 10.9.0 | 10.8.4 |
| | 32ca2 | 10.9.0 | 10.9.0 ← |
| | 900e5 | 10.9.0 | 10.9.0 |
| | 527fa | 10.8.4 | 10.9.0 |

Detecting new version trend

FIGURE 6

Device Version Profile A:
{DeviceID: 1ece4,
OS: Android 4.4.4,
Device Model: Nexus 5,
Carrier: Verizon,
AppA: 1.39
AppB: 3.42}

Recommendation Response
{'No updates'}

Device Version Profile B:
{DeviceID: 1ece4,
OS: Android 4.4.2,
Device Model: Nexus 5,
Carrier: AT&T,
AppA: 1.12
AppC: 2.2}

Recommendation Response
{'No updates'}

Device Version Profile C:
{DeviceID: 1ece4,
OS: Android 4.4.2,
Device Model: Nexus 5,
Carrier: Verizon,
AppA: 1.12
AppC: 2.2}

Recommendation Response
{
{OS: 4.4.4,
link: http://example.com/update'},
{AppA: 1.39,
link: http://appstore.example.com/AppA}
}

FIGURE 7

|        | Component |              |
| Device ID | Version | Account Type |
| --- | --- | --- |
| 7f2e2  | 10.8.4  | Free |
| 3j302  | 10.8.2  | Pro ← |
| mdo20  | 10.8.4  | Free |
| qis93  | 10.8.4  | Free |
| j2jd9  | 10.9.0b | Free |
| dnxo2  | 10.8.2  | Pro ← |
| 2inc0  | 10.9.0b | Free |
| 5ishg  | 10.7.5  | Free |
| jdit2  | 10.8.2  | Pro ← |
| a374a  | 10.8.4  | Free |
| 5c9539 | 10.8.4  | Free |
| 1ece4  | 10.9.0  | Free |
| 5673a  | 10.9.0  | Free |
| 32ca2  | 10.8.2  | Pro ← |
| 900e5  | 10.9.0  | Free |
| 527fa  | 10.8.2  | Pro ← |

Weighting Device Profile according to account type to recommend 10.8.2 as preferred OS

FIGURE 8

SYSTEM AND METHOD FOR DETERMINING COMPONENT VERSION COMPATIBILITY ACROSS A DEVICE ECOSYSTEM

CROSS-REFERENCE TO RELATED APPLICATIONS

This application is a continuation of U.S. patent application Ser. No. 14/743,783, filed on 18 Jun. 2015, which is a continuation of U.S. patent application Ser. No. 14/482,796, filed on 10 Sep. 2014, which claims the benefit of U.S. Provisional Application No. 61/876,109, filed on 10 Sep. 2013, all of which are incorporated in their entireties by this reference.

TECHNICAL FIELD

This invention relates generally to the software versioning field, and more specifically to a new and useful system and method for determining tool version capabilities field.

BACKGROUND

The availability of open source and proprietary hardware and software tools has resulted in the rapid development of new and varying products. Hardware and software tools such as computing system firmware, operating systems, software development kits, hardware components, and other tools can be used, modified, and/or repurposed to accelerate the product development process. Recently, a popular tool or device component has been the Android operating system. However, the Android operating system has not only been used in developing new phones but also tablets, computers, smart devices, and other devices using some form or version of the Android operating system. As it is applied to different systems and applications though, working with the devices becomes increasingly difficult—the system becomes increasingly fragmented. One report cited that over 11,000 distinct Android devices were in use in 2013, which grew to over 18,000 in 2014. Each of these devices may have specific hardware limitations, network carrier limitations, product system limitations (e.g., who sells and maintains the product), and other complications, which complicate the network of responsibility in maintaining the device. Such fragmentation presents numerous challenges. In particular, the security of Android devices becomes difficult to manage due to the various relationships and responsibilities of the involved parties. Such problems are also prevalent for other widely used tools and device components. Thus, there is a need in the software versioning field to create a new and useful system and method for determining tool version capabilities. This invention provides such a new and useful system and method.

BRIEF DESCRIPTION OF THE FIGURES

FIG. 6 is a diagram of detecting a new version trend within exemplary data from a device profile repository;

FIG. 7 is a diagram representing collected device version profiles and showing exemplary recommendations for queries associated with those device version profiles;

FIG. 8 is a diagram representing weighting component versions; and

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System for Determining Tool Version Capabilities

Figure 1:
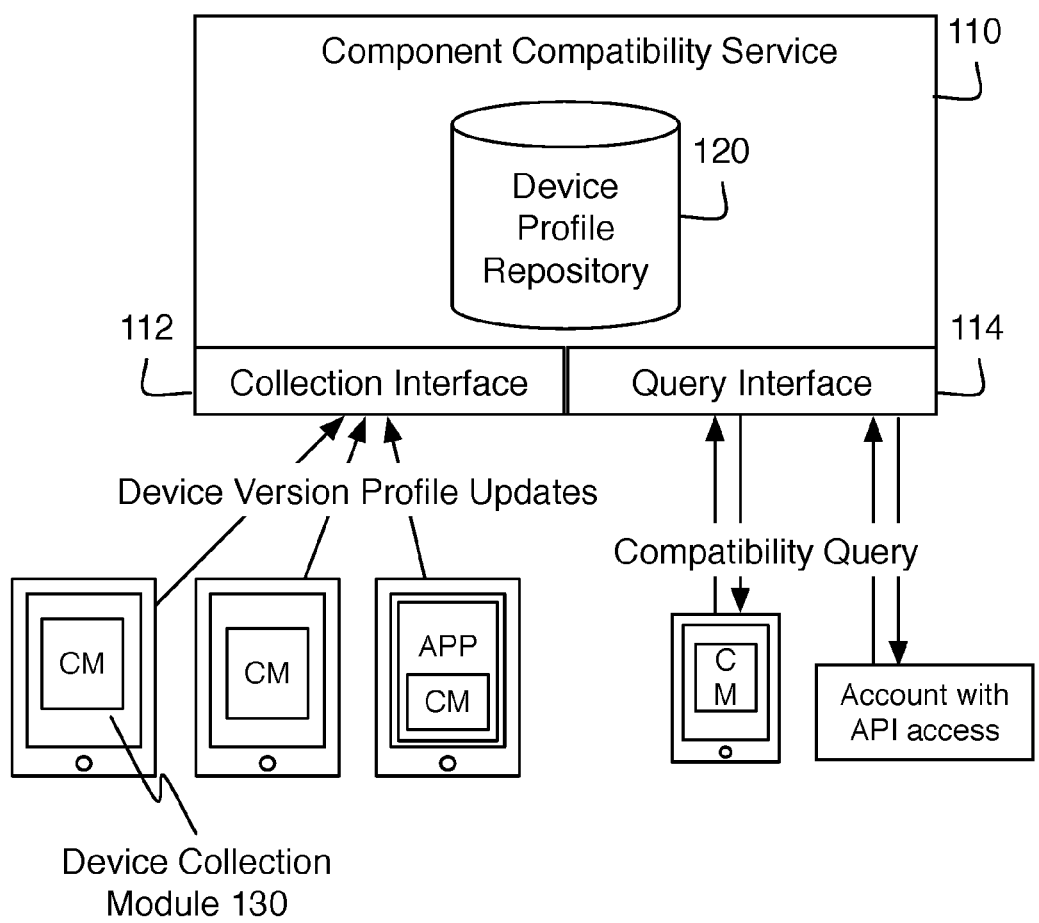
FIG. 1 is a schematic representation of a system of a preferred embodiment.

As shown in FIG. 1, a system for determining component version capabilities of a preferred embodiment can include a component compatibility service 110 that is communicatively coupled to a device profile repository 120. The system can additionally include a plurality of device collection modules 130 operatively distributed to a plurality of devices. The system functions to collect component version information and more preferably device version profiles across a wide sampling of devices. That data is then organized and processed such that recommendations can be made for the tool version and related attributes. The system can be applied to generate component compatibility assessments, component recommendations, component analytics within device populations, identify component conflicts, component trends, and other suitable component version related information synthesis.

In a preferred implementation, the system is used to determine recommended stable versions of an operating system for a particular device. For example, the Android operating system is a highly fragmented ecosystem with a wide variety of device, carrier, and country component variations. Upgrading a system to the most secure and stable version of the operating system is not as simple as using the highest version number of the operating system. There are hardware restrictions, carrier restrictions, country restrictions, and other restrictions. The fragmentation issue is so complicated that it can be intractable for outside parties to attempt to uniformly improve security of the Android ecosystem through existing version information. However, using a distributed sampling of operating system version and device information, the system can achieve probabilistic recommendations of component versions. For example, the system can be used to identify recommended vulnerability and security patches that are compatible with a particular device instance. While the Android operating system is one such tool, the problem can be evident in other widely used and/or modified tools such as open source software projects, hardware platforms, and other tools used in building products. In another example, an open hardware component may allow for different hardware modules developed from various entities to be used in combination. Module compatibility and firmware updates across multiple modules can similarly benefit from the system.

The component compatibility service 110 of the preferred embodiment functions to act as a centralized service for collecting and managing component version information. The component capability service 110 includes or is communicatively coupled to a device profile repository 120. The component capability service no can additionally function to process service queries concerning tool compatibility. The component compatibility service 110 is preferably a remote cloud-hosted service. A cloud-hosted service can be any suitable network accessible server, computer cluster, or distributed computing environment. The component compatibility service no can additionally be a sub-component of or cooperatively integrated with a second network accessible service used for a secondary purpose such as a vulnerability assessment service, a two-factor authentication service, a system update service, an analytics service, or any suitable network accessible service. The component compatibility service no can be a public service, wherein outside entities may be capable of accessing and using the system. The component compatibility service 110 may alternatively be an internal or on-premise solution that operates within a closed ecosystem such as a service run on some IT solution of an Enterprise entity.

The component compatibility service 110 is preferably applied to tracking component versions across multiple devices. Component versions can include the version or type identifiers of one or more software or hardware modules which can include version identifiers for operating systems, device models, applications, device wide services, software packages or libraries, firmware, plugins, vulnerability or security patches, hardware add-on/accessory, and/or other suitable device tools. The component compatibility service 110 preferably uses the variety of device instance configurations and optionally additional device instance context information such as language settings, communication/data providers (e.g., telecommunication carriers).

The component compatibility service 110 can include at least two interfaces. A first interface is a collection interface 112, which functions as an input channel for receiving component version updates. The component version updates are preferably received from a plurality of different device instances. The system uses a large collection of component version updates from a diverse collection of devices. The collection interface can be used to collect device version profiles updates from application collection module instances installed on client devices. The application collection module can be a standalone application, a software development kit used by third party applications, a plug-in added by a user, a web application, or any suitable component operable on the device. There can additionally be a plurality of different types of application collection modules used to collect information. An application collection module instance reads or determines information for the device version profile transmission and then transmits the device version profile to the cloud-hosted service. The transmission can be over HTTP but any suitable protocol or communication channel can be used. A transmitted device version profile may be communicated as a single data object, but a set of component version and other information may be communicated at different times such that a full device version profile is constructed or updated within the component compatibility service 110 over time period.

The second interface of the component compatibility service no is a query interface 114. The query interface functions to allow the data in the device profile repository 120 to be collectively processed to determine solutions concerning tool compatibility. The query interface 114 can be the same interface as the collection interface 112 (e.g., the request includes a device version profile update and the response includes information relating to the compatibility of that device instance). The query interface 114 can alternatively be separate and used by outside parties to programmatically interact with the component compatibility service no. For example, the query interface 114 can be used to selectively impact operation of an application. In another variation, the query interface 114 is an internal interface and is not exposed externally. The internal query interface can be used to selectively impact operation of secondary objectives of the component compatibility service no such as during a vulnerability assessment of a device or when providing system updates.

The device profile repository 120 of the preferred embodiment functions to store component version information records of various device instances. An individual record corresponds to a single device instance. A device instance preferably directly relates to one physical device. For example, the phone used by a particular user may have one corresponding device profile that characterizes the version state and optionally device configuration of that phone. More preferably a device instance is associated with a time attribute. A device version profile may be associated with one time that when the information was collected. A device version profile can alternatively have a timeline history of evolution for that particular device version profile. For example, a device version profile may show that a particular device instance is regularly updated to a stable version or conversely that the device instance is infrequently updated despite available or recommended updates.

A single device version profile can include component information for multiple components. A device version profile may alternatively include component version information for only a single component or tool. Additional contextual or configuration information may supplement the device version information. In one limited example, an operating system version identifier may be mapped to a device model number in the device version information. In one variation, the operating system is of primary interest in the system but the primary component of interest could alternatively be any software project, hardware firmware, physical hardware architecture, and/or other suitable tools. In one example, the system can be applied to tracking component compatibility with the Android operating system.

The device profile repository 120 can be a database(s) of the collected tool version updates. The device profile repository 120 can additionally be reformatted or architected to pre-format component version patterns according to anticipated queries. For example, one preferred use case is to provide a recommended operating system version based on a device, carrier, country, and other device information. The repository can structure the database structure to improve the efficiency of determining the recommended version of the operating system.

The system can additionally include a device collection module 130 which functions to retrieve, generate, or collect a device version profile on a device instance. A device collection module 130 is operative on at least one device. The device collection module 130 can be a standalone client application, a software development kit used by third party applications, a plug-in added by a user, a web application, or any suitable component operable on the device. When integrated into an application with a secondary objective, the application can be a device vulnerability assessment application, a two-factor authentication application, a system update application, an analytics service of an application, or any suitable component of an application. The device collection module 130 collects a device version profile from the device. In one preferred implementation, the component of interest is the device operating system. The operating system version number is retrieved. Additionally, information can also be retrieved such as the device model, associated parties, supplemental information (e.g., usage information, installed applications, etc.), and other information impacting the version of the component.

2. Method for Determining Tool Version Capabilities

Figure 2:
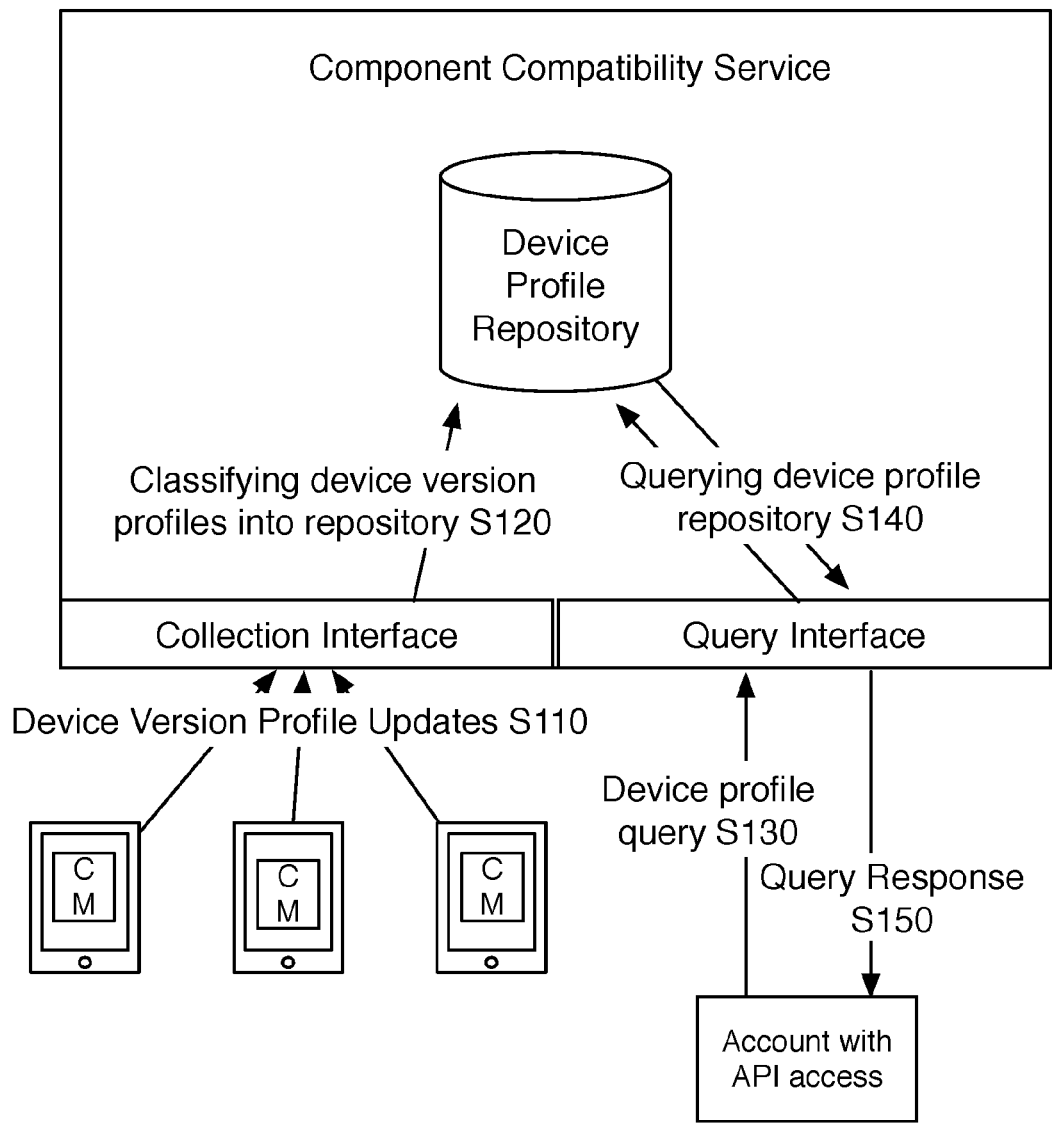
FIG. 2 is a schematic representation of a method of a preferred embodiment.
Figure 3:
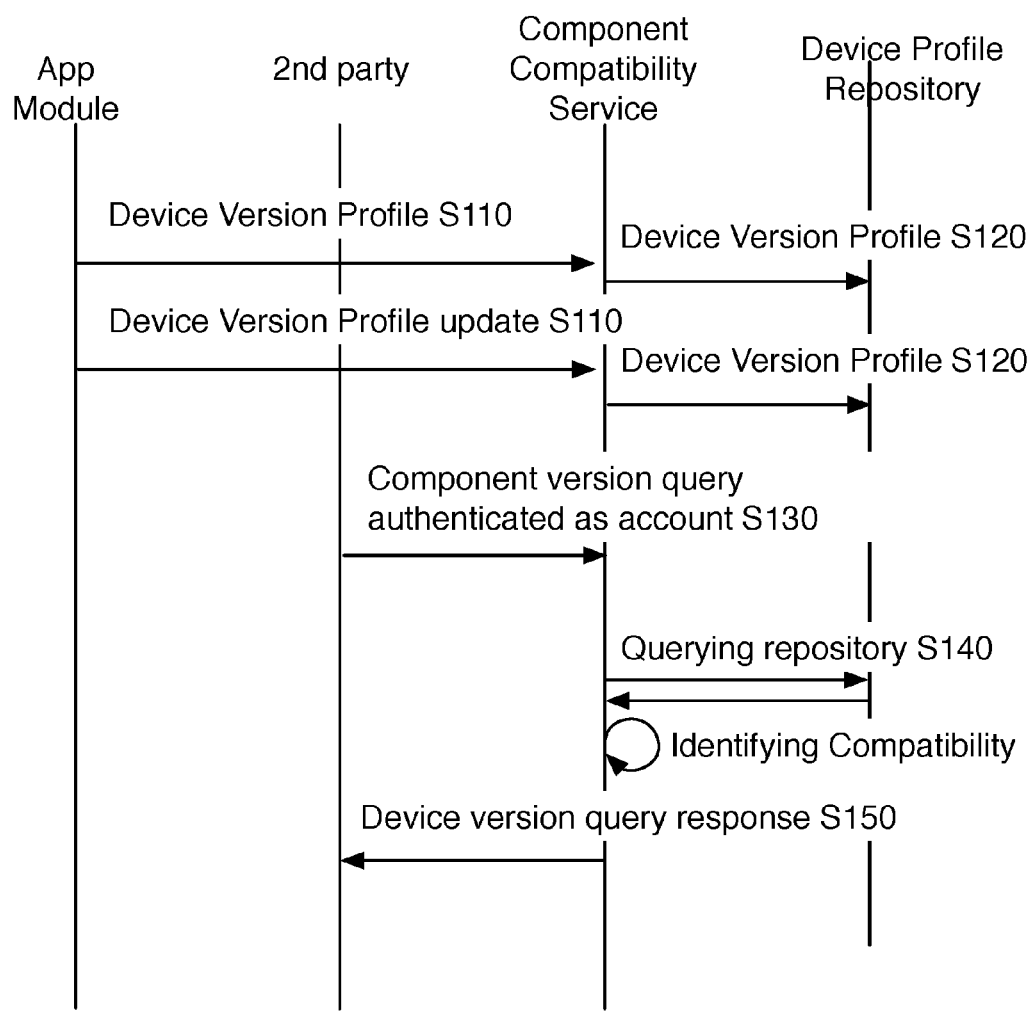
FIG. 3 is a communication flow diagram of a method of a preferred embodiment.

As shown in FIGS. 2 and 3, a method for determining tool version capabilities of a preferred embodiment can include collecting device version profiles from a plurality of sources S110, classifying the device version profiles into a device profile repository S120, receiving a component version query request S130, querying the device profile repository according to the component version query request S140, and responding to the request with a result of the query S150. The method functions to use a vast amount of component version information from a diverse set of device instances to dynamically determine capabilities and recommendations of a component. The component of interest is preferably an operating system such as the Android operating system, but the device component could alternatively be a type of any application, device-wide service, software package or library, firmware, plugin, vulnerability or security patch, hardware add-on/accessory, and/or any suitable device tool. Herein, a device operating system is primarily used as an exemplary tool, but the examples can similarly be applied to other types of components. Traditional approaches of maintaining a database of version information for a device become intractable when tools are susceptible to fragmentation along multiple dimensions (device model, country, carrier, etc.). The method is particularly beneficial with the increase of sharing of software, firmware, hardware, and/or physical or software components. Sharing of modifiable device components (as open-source or accessible device elements) results in de-standardizing of such tools. The big-data social approach of the method enables services to manage information of a fragmented component ecosystem.

The method is preferably implemented through a cloud-hosted service such as the one described above. A plurality of devices using a collection module can connect to the hosted service to facilitate collection of component version information. The component version information is preferably organized into a device version profile. The system is preferably implemented by a service substantially similar to the one described above, but any suitable service can implement the system. In one variation, the method is used in cooperation with a vulnerability assessment system or method as described in U.S. patent application Ser. No. 13/601,409, filed 31 Aug. 2012, which is hereby incorporated in its entirety by this reference. The method may alternatively or additionally be used with any other supplemental services such as an authentication service, password management, app/component store, anti-virus or security software, and/or any suitable service.

Block S110, which includes collecting device version profiles from a plurality of sources, functions to receive and store component version information from multiple devices and users. The collected device version profiles are preferably used to form a large corpus of version information for one or more components. A large number of component version information records are collected from a plurality of different device instances. The component version information can be organized, formed, or otherwise converted into a device version profile as shown in FIG. 7, which functions as a data object representing a device instance. In one variation, a set of component version information is collected at different instances in time and a device version profile is formed in the cloud-hosted service. The variety of device instances providing the component version information is preferably diverse enough to collect sufficiently large sample sets for many, if not most or all, device variations. Preferably, system is a multitenant platform that facilitates collecting information across multiple entities or operators. For example, if a collection module is integrated with a two-factor authentication SDK, then all the apps using the 2FA SDK can provide device version profiles to the system.

Collecting device version profiles can include periodically collecting device profile information, which may include updating existing device version profiles or collecting device version profiles of new device sources. Since the component and device variations can be a constantly evolving environment (within a single device instance and for new device instances), the collection of data can be a continuous, periodic, or ongoing process. A record of a device version profile can additionally be updated during block S110 if a device was updated or changed. The device version profile is preferably received at an internet connected cloud-hosted service through a collection interface. The device version profile can alternatively be sent over any suitable communication channel. The device version profile is preferably transmitted from the device instance the information references. The device can be a personal computing device such as a smart phone, a tablet, a desktop computer, a wearable computing device, a TV connected computing device, or any suitable computing device.

Figure 5:
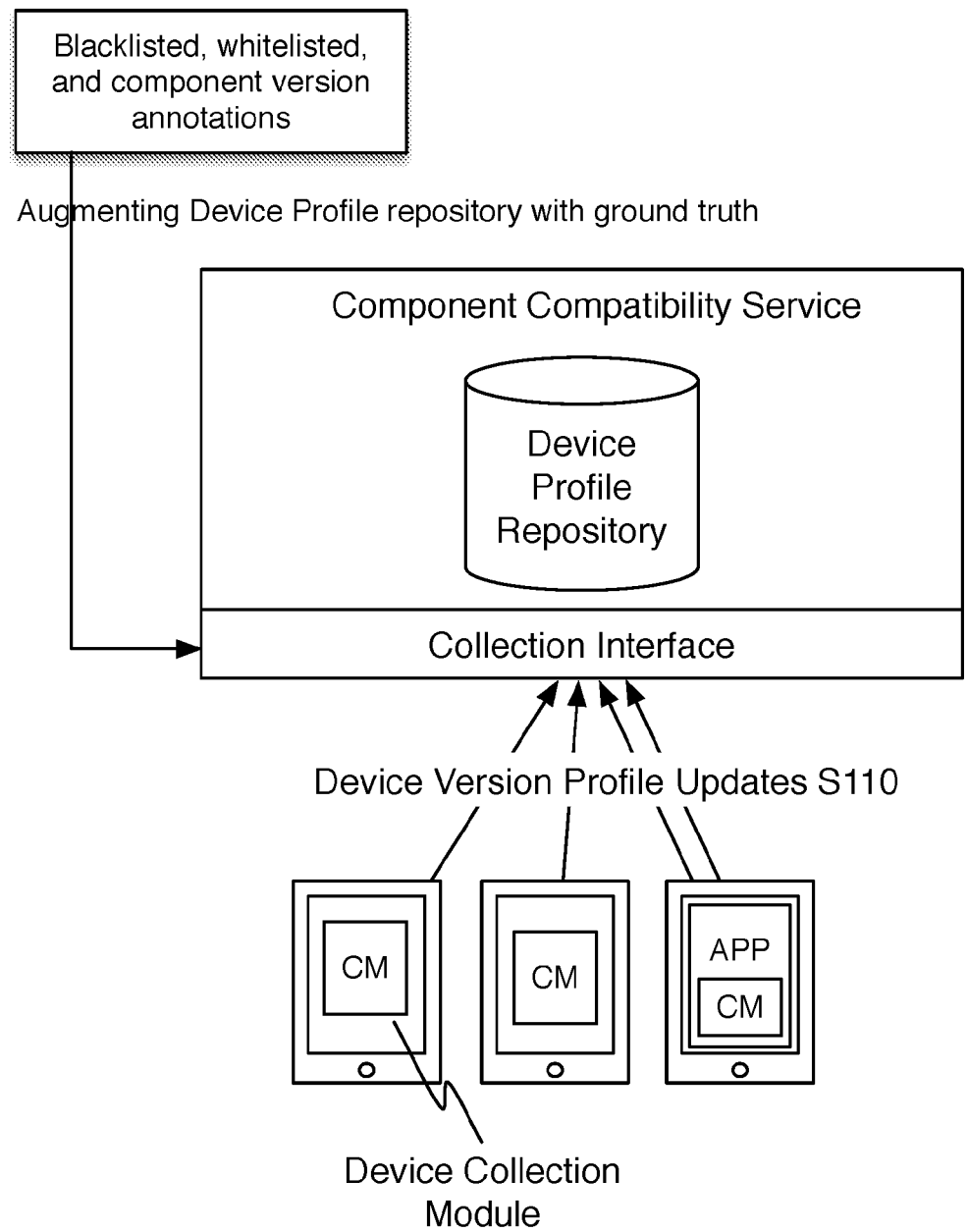
FIG. 5 is a schematic representation of a variation including annotating the device profile repository.

The device version profile can include the version number of at least one component/tool identifier, the device model, associated parties, carrier information, device user configuration (e.g., language settings), and other information impacting the version of the tool. The component in a preferred implementation is an operating system. There are various factors that can impact the most current version of an operating system that can run on a particular device. The device version profile of an operating system of a mobile device can include the current operating system version, the device model and/or hardware configuration, and the carrier/network provider. It can additionally collect information such as country or language requirements. In some devices, such information may not be available, applicable, or accessible so a partial set of available information can alternatively be collected. Additionally, capabilities of the component can be characterized or transmitted as a profile of the current tool version. For example, the current design of the tools and available functions and features can provide a fingerprint or signature indicative of the device version profile. As another addition, the device version profile can include supplementary version information of related tools or components. For example, firmware versions, application versions, plug-in versions, hardware versions, or other related components used within the device could additionally be transmitted. The supplementary version information can be used to provide compatibility information. While determining the most current version of a component can be a challenging problem, determining the most current version of a compatible component can additionally be challenging. Such compatibility issues can have multiple dependencies. The component version information stored within the device version repository can additionally be seeded, supplemented or supplied with ground-truth data or previously collected data, which can involve augmenting the device profile repository with component version annotation. The component version annotation can include black listing or weighting preference of particular component versions as shown in FIG. 5. Similarly the component version annotation may be based on a set of device properties. For example, a particular operating system version may be blacklisted for devices of a particular model from a particular carrier.

In one implementation, providing an application module used by the source devices can facilitate transmitting the device version profile from a device to a central system (e.g., the cloud-hosted service). The application module can be a standalone application, a software development kit or library used by third party applications, a plug-in added by a user, a web application, or any suitable component operable on the device. There can additionally be a plurality of different types of application modules used to collect information. The application module preferably reads or determines information for the tool version transmission. The application module will read the information and then transmit the device version profile to the cloud-hosted service. Reading the information may include accessing exposed or hidden API's to read version identification information for a particular device. In some variations, the version identification information may not be exposed for direct access. The application module may run various tests to determine a version identifier or set of identifiers. As one particular example, some features may be offered by a second version of a component that isn't offered by an initial version of the same component. The application module may test for the presence of those new features and if detected conclude the component is the second version.

The application module is preferably used by a large number of users. The transmission can be a complimentary communication of another service—the purpose of the application may not be directly for collection version information. For example, the information can be collected and used alongside a vulnerability assessment, a two-factor authentication application, a system update application, an analytics service of an application, or any suitable component of an application.

Block S120, which includes classifying the device version profiles into a device profile repository, functions to store and organize data around the version information. Preferably, the state of individual device instances is recorded in a database system or an alternative data storage solution. In one variation, the state of the devices is persistently stored such that specific device information for a particular device at particular time can be used in data analysis. Alternatively, the information may be organized into an aggregated analysis of a set of devices, wherein information for a particular device is obfuscated as an aggregate data point. An aggregated data approach may record values to generate the probability of a given component within a device population and/or the conditional probability for particular component. The collected information device version profiles are preferably stored at or at least accessible by the cloud-hosted service. The device version profile preferably is stored as a record including version number of a component, the device model, associated parties, supplemental information, and other information impacting the version of the tool. Additionally, the device source can be recorded. The source of the information can be used in weighting the information and evaluating the collected data as a whole in Block S140. Additionally, the time of collection is tracked. The device version profile can be similarly weighted based on age of the data point.

Classifying device version profiles can include processing and creating device version profiles. In one implementation, a device version profile data object may include an instance identifier that is unique to the particular device instance, a time stamp of when the information was collected (or last updated), a first component version identifier (e.g., a primary component of interest such as an operating system), an optional set of additional component version identifiers, and a set of device context information. In one variation, there will be only one class or type of component of interest. In another variation, multiple types of components will be of interest, and version identifiers will be collected for these component types as well. In another variation, other types of components can be used to provide context of the primary component—in which case, component version identifiers for these components are collected for context. The context information can include a device model identifier, carrier information, country/location information, user configuration information, and/or any suitable information related to the environment of device. The information in the device version information can be used to make objective data driven analysis such as this percentage of devices of this model use this operating system. Some information may alternatively be used to drive subjective analysis such as users that commonly use their devices in secure manner use this operating system or users with behavior leading to device vulnerabilities use this set of components. The device version profile may additionally include a history of device profile snapshots. For example, the set of component versions for a device at different intervals may be stored such that the history of how the device configuration has evolved can be monitored. In an alternative implementation, each snapshot can be stored as a unique device instance.

Block S130, which includes receiving a component version query request, functions to initialize identification of tool capabilities. The query request can be an internal query of the system, such as when used in combination with providing a vulnerability resolution product. In another variation, the query request can be made by an authenticated account through a query API of the system as shown in FIG. 2. In this variation, the system is preferably a multitenant platform. Whereas the individual user may only have contributed limited or no information related to device profile information, the request can be fulfilled using the systems data collected across from multiple sources.

The component version query request preferably includes a set of component version information to define constraints of the query. More preferably, the component version query is an at least a partial device version profile. Block S140 can apply the information included in the device version profile query to identify a compatible or recommended component based on multiple properties of the profile. For example, the recommended operating system may be identified based on the device model, the carrier information, and the set of other component version numbers. Alternatively, the component version information can include a single component version identifier such as a device model identifier. In yet another variation, the request may be an unconstrained request wherein the result may include the recommended component (e.g., most secure, most stable, most popular). In yet another variation, the constraint may be that of multiple version identifiers or device version profiles. For example, an IT department that has deployed IT managed phones to numerous employees may have those phones be in various version states (different OS's and device models). If the IT department was wanting to install a particular application or service across these devices, the IT department could submit a query with a range of component versions and the result could include the recommended component version that would work across all their deployed devices.

Figure 4:
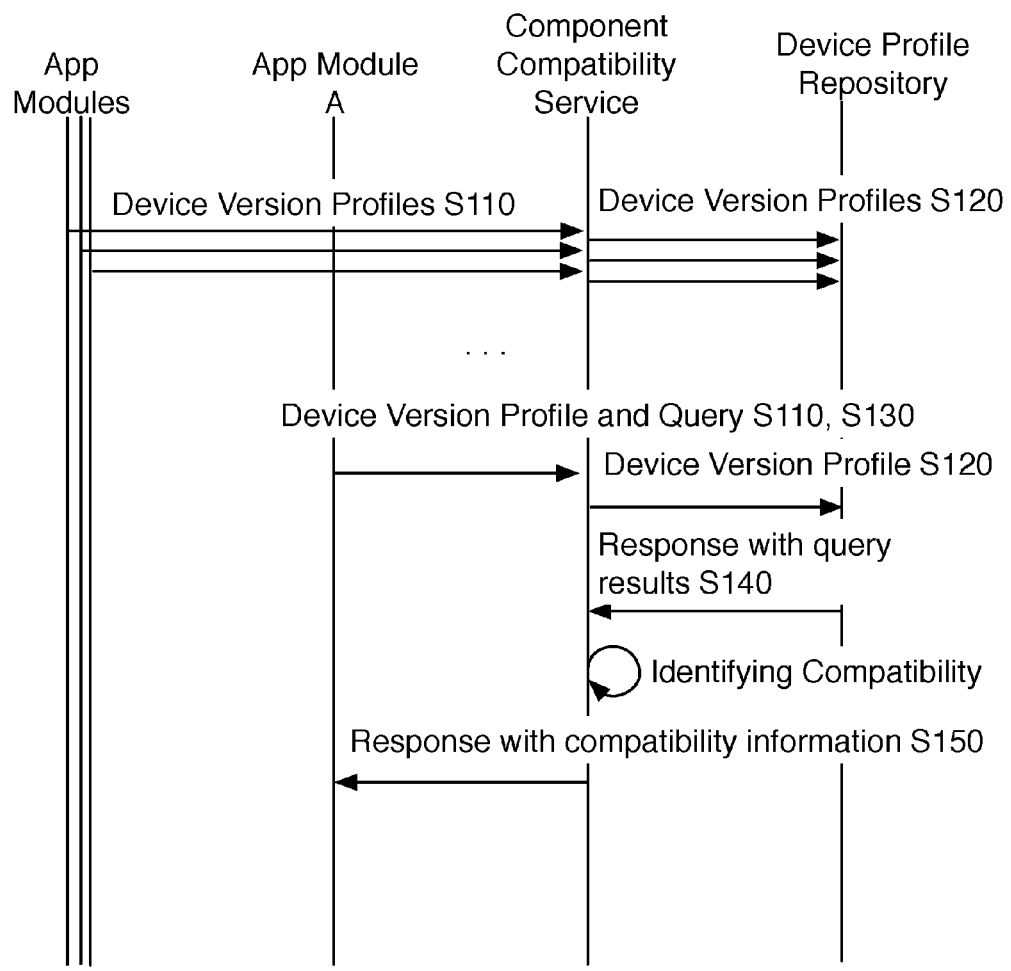
FIG. 4 is a communication flow diagram of a variation of a method wherein the query submits device profile information stored in the repository.

The query request, in one implementation, can be the same transmission used to provide a device version profile of a device instance as shown in FIG. 4. For example, a device may transmit operating system version information and in response, receive the capability results. This on-demand providing and receiving of information is achievable after sufficient data has been collected. In an alternative variation, the capability query request is distinct from collecting information. In one implementation, a first interface of the cloud-hosted service (i.e., a collection interface) is used in collecting component version information used in a device version profile, and a second interface of the cloud-hosted service (i.e., a query interface) is used to provide processed results for specific queries. The query interface can be exposed externally to outside entities or alternatively used internally in operation of the cloud-hosted service. The capability query includes at least one device profile. In a preferred implementation, the capability query is used in determining the most recommended version of a component that is compatible with a particular device (or set of devices).

The query can additionally specify other parameters that alter the type of information requested. For instance, query may want a recommendation of the most "stable" version, "most cutting edge", "fastest trending", "most popular", "most secure" or other qualifier for a component. The recommendation can additionally be set for particular platforms. For example, a query property can be set to "latest Android version" or "latest iOS version". Further the parameters can define a set of options. For example, the query property can include a qualifying parameter that adjusts the version or time window of recommendations. For example, a qualified query parameter can be "Android last two major releases". The query parameters can be automatically inferred based on a query of the device profile repository. Other qualifying parameters may adjust the scope of device profiles considered. For example, a query parameter may scope the query based on device model, operating system type, carrier, account name (e.g., within a corporate fleet of devices), country, or other suitable qualifying parameters. The query parameters can be automatically inferred based on a query of the device profile repository. Additional filters can be set such as restraining a search to a particular location or any suitable condition.

Block S140, which includes querying the device profile repository according to the component version query request, functions to process the component version information to determine information relevant to the query. In a first variation, the query is attempting to determine if one or more particular components are compatible with a particular device version profile. In another variation, the query is attempting to determine if any updates to current components are available and/or recommended. In another variation, the query is attempting to determine if any new components are recommended for a particular device configuration. The query is preferably specific to a particular device version instance (or a set of device instance properties) as shown in FIG. 7, as opposed to a basic understanding of what version is the most current globally. In some cases, a particular device may be limited from updating to particular version or may require an alternative component. For example, if a particular device type can't update to a most recent operating system, a third party software patch may resolve a vulnerability that is present in the operating system available to that device. Querying the device profile repository can include searching the database, identifying, using various data analysis processes to generate data-driven results. Querying the device profile repository can identify one or more compatible components (including specific version recommendations), device capability breakdown, population or ranked component breakdown, or any suitable type of result. Identifying capabilities of the device preferably includes applying probabilistic analysis and weighting of related component version information to determine the capabilities of the device. The method preferably uses group analysis to determine the most likely response based on the status of other devices. Such analysis may involve identifying corresponding device version profile records. Corresponding device version profile records are other device instances that currently or previously had substantially matching profiles. The collected data used is preferably a subset of records with matching scenarios. For example, in identifying a recommended version number, records with matching device model and carrier information from the same country can be used. If insufficient data samples are available, the subset of records can additionally include similar records, such as records of the same device model but different carrier information.

Querying the device profile repository can include identifying capabilities of a device as defined by the device version profile information from the query. In particular variation, querying the device profile repository can include identifying emerging components within the device profile repository as shown in FIG. 6. When new versions are released and adoption begins, the system can automatically detect the transition of a component to a new version. In one variation, detection of emerging components can differentiate between beta versions, test versions, or versions that may have higher version numbers but aren't recommended new versions. A threshold number of device profiles may need to adopt the emerging version before it can be considered the most up to date. Alternatively, the augmenting of the device profile repository with version annotations as in FIG. 5 can additionally facilitate new version identification. Additionally or alternatively, querying the device profile repository can include weighting component versions. When applied to identifying evolving version ecosystem, accounts classified as "stable" may be stronger indicators of current versions. Stable accounts may be device version profiles from device instances that regularly update to the most current and reliable version of components. Weighting component versions can alternatively be applied independent of new version detection. The records can be weighted, during the querying process, based on the age of the records, the history of the records, the source, closeness of match, or any suitable parameter. In one variation, device version profiles that come from accounts of a trusted corporate partner can be given more weight since the devices are more trusted as shown in FIG. 8. This variation can include detecting an entity associated with a device version profile, and augmenting the weighting the detected device version profiles—increasing or decreasing preference. The identification can be performed on demand in response to a newly received capability query. Additionally or alternatively, the device version profiles can be pre-processed and structured such that the capabilities are pre-determined and the capability query accesses the processed results. In one implementation, identified capability results for a query are cached for subsequent or related queries.

Various types of capability queries can be made. Often, at least one field of the component version information will be of interest in the results. In a preferred variation, a recommended version number or identifier of a component is identified for the provided device version profile of the capability query. For example, a device will send the device model, the carrier information, and optionally operating system version information, and in response, a recommended version of the operating system is identified. The recommended version is often a version that is predicted to be most stable and/or secure. In this example, the recommended version can be identified by looking at other records of the same device model and carrier information. Then the operating system version used by the highest percentage of devices can be determined to be the recommended version. Those records can optionally be weighted based on the source or age of the records. For example, the highest raw percentage of users may use a first version of an OS, but a newer and more secure version may have been recently released. The identification process can be augmented so that trending or newer information would result in identification of the newer version despite not being the most popular. The OS version recommendation can additionally be augmented based on version rules such as the order in which a recommendation will trend over time, white-listed or black-listed version numbers, and other rules. Beta versions, developer releases, version number spoofing, and other scenarios can be overcome by the analysis and heuristics of the identification system. Alternative types of queries can include identifying devices that support a particular version number and identifying supplemental components that are compatible or recommended for a component.

As mentioned above, the method can include weighting device version profiles according to the source, which can include classifying version information records with user information. This variation can include classifying device sources. In one implementation, the device version profiles are collected by an application that has an account system. The history of the account records can be used in evaluating the trustworthiness of the device version profile record. A record can be given more weight, no weight, or negative weight. If the account is a paying account, then the account can be assumed to be more trustworthy due to the financial barrier. If the account frequently updates the tool/device, the user will often have usage habits indicating their system is well maintained. In some situations, the application is used for vulnerability assessment, two-factor authentication application, system updates, and thus more regular use of the application can be a signal the user is sensitive to using up to date versions. Similarly, usage patterns outside of the application can be a signal of the trustworthiness of the device version profile. The supplemental information can indicate if the account has device usage patterns. For example, the list of applications installed on the device or the change in location information can be signals of the risk of the device. On the contrary, accounts that are free accounts that infrequently update their device, that include supplemental information indicating suspect applications, or include other signals may be penalized. In some cases, the weighting can be used to penalize the use of that version. For example, a user that includes several applications only accessible to jailbroken devices may be penalized such that the corresponding tool version is avoided based on the corresponding record.

Block S150, which includes responding to the request with a result of the query, functions to act appropriately to resolve the capability request using the identified analysis. In a first implementation, a response is transmitted to the source of the compatibility request. In a first variation, the query requests the recommended version of the tool (e.g., current stable version), and the response is the version number or other suitable identifier. In another variation, the identified capabilities are used to fetch or generate a recommended, suggested, or possible system update to update one or more components. The update can be a vulnerability or security update. The response can be a link to the necessary updates, or alternatively, initiate a data transfer of the update. In another variation, the response includes a set of information satisfying the query. For example, a query may request device compatibility with a particular version of a component, and the response can include a set of device identifiers that are capable of running with that version of the tool. In one implementation, the cloud-hosted service is configured for outside parties to request the information. An API or alternative query interface can be used. The responses are delivered to the requesting entity, which could include client applications and/or third party application services. For example, an application developer can use the tool to selectively recommend a user update an operating system. In an alternative implementation, the query and response are used internally to the cloud-hosted service. For example, a vulnerability assessment service can use the tool compatibility service to determine the recommended or executed security updates on a particular device.

In one alternative implementation, the method is applied to a platform version control system wherein the method is used to indicate if a device or component is in compliance with component version conditions. This variation functions to allow checks to be performed on individual devices to see if they are in compliance. The platform version control system is preferably used in a system wherein there is a set of different devices accessing or otherwise making use of the system. An administrator of the system can set one or more component version conditions. One-time or periodic checks may be made on the set of devices to determine if one or more components satisfy the component version condition. In one implementation, a user interface allows an administrator to set the allowed component versions. The components of interest can be any suitable type of component. In one example, an administrator can set the operating system version conditions. Operating system version conditions may be specified by selecting options such as "latest iOS version" or "latest Android version". These absolute component version conditions may result in a device not passing because it has not been upgraded or because it is ineligible for the latest version. Operating system version conditions may alternatively include options such as "last two major releases for Android", "latest version of Android for this device", or "latest version of Android for this device and not less than Honeycomb". The component version conditions can alternatively be set through an API or any suitable condition. This implementation preferably similarly depends on collecting component version information. When a device attempts to use the platform (or at any suitable time such as registration), an at least a partial device version profile is collected from the device. A query is made on the device profile repository using the the device version profile of the particular device. Results of this query can be compared to the component version conditions and then the device can be determined to be in compliance or not incompliance. If in compliance the device is preferably allowed to use the platform. If not in compliance, the device is preferably prevented from accessing the platform. Alternatively, access to the platform may be limited. Additionally, the device may be required to perform an update of the component. In the case of the device not being compatible with allowed component version, a notification that informs the user to update his or her device.

In another usecase, the method may be applied to generating automatic update notifications. These update notifications are preferably dependent on the particular device and a comparison to the device profile repository. For example, an employee's Moto X on T-Mobile accessing a corporate network can be detected as not being fully up to date since seen 10 other similar devices were observed with a higher component version.

Figure 9:
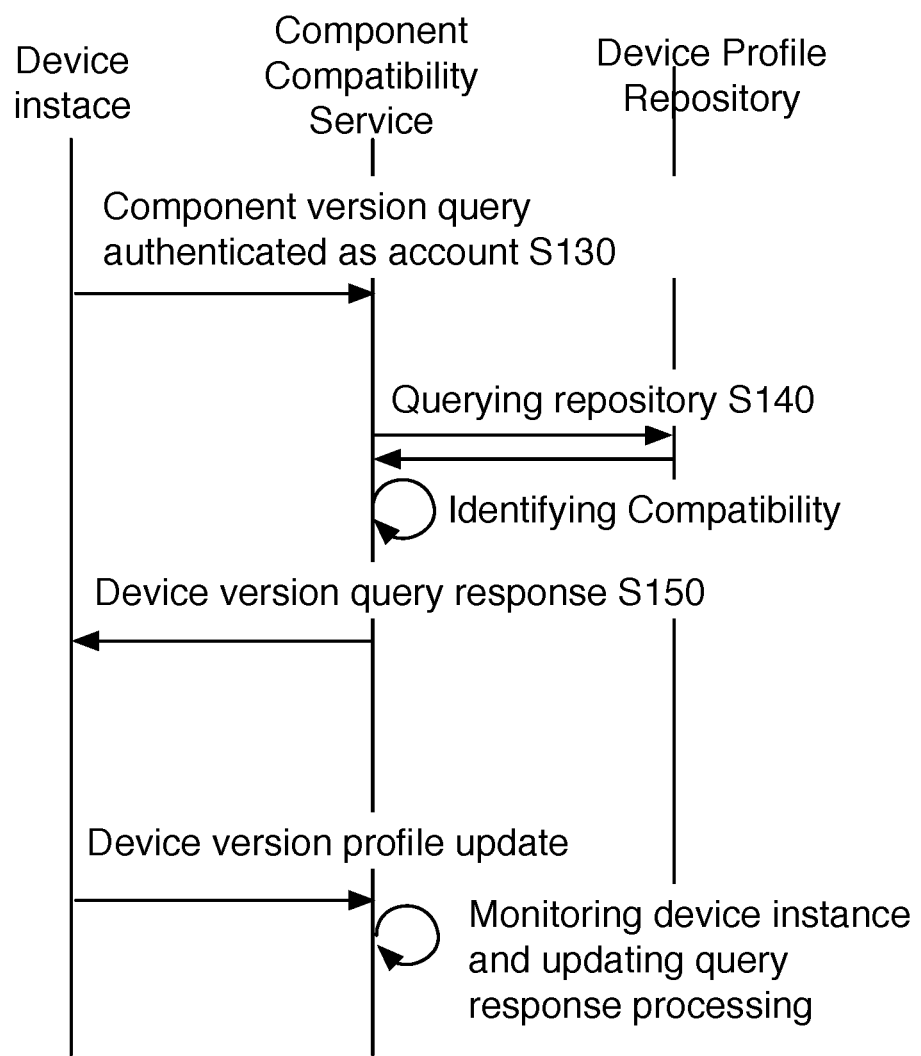
FIG. 9 is a communication flow diagram of a variation monitoring a device instance.

Additionally, the method may include monitoring the device instance associated with the device version profile of the query request as shown in FIG. 9, which functions to generate feedback on the supplied result. Monitoring a device after making a recommendation may be used to determine if that recommendation was followed, and if that recommendation was maintained. The subsequent monitoring can function to identify user resistance to a particular system update. The subsequent monitoring may additionally function to automatically identify component versions that are incompatible—the device either can't perform the update or after the update it breaks functionality of another component or the device is rolled back to another version. Monitoring a device instance after making a recommendation can function to improve the component querying and recommendation process.

The system and method of the preferred embodiment and variations thereof can be embodied and/or implemented at least in part as a machine configured to receive a computer-readable medium storing computer-readable instructions. The instructions are preferably executed by computer-executable components preferably integrated with the tool compatibility service and device profile repository. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
   at a network connected platform, collecting component version information from a plurality of device instances;
   for each device instance, constructing a device version profile from the component version information;
   classifying the device version profiles into a device profile repository;
   at a network connected platform, receiving a component version query request, the component version query request including a set of constraints defined by specified component version information;
   querying the device profile repository according to the component version query request; and
   responding to the query request with results of the query.

2. The method of claim 1, wherein collecting component version information from a plurality of device instances comprises collecting at least one of operating system version information, firmware version information, and application version information.

3. The method of claim 1, wherein collecting component version information from a plurality of device instances comprises collecting at least one of carrier information, location information, and user configuration information.

4. The method of claim 1, wherein collecting component version information from a plurality of device instances comprises collecting hardware version identifiers and configuration information.

5. The method of claim 1, wherein the response specifies at least one recommended compatible device update.

6. The method of claim 5, wherein the compatible device update is a vulnerability update.

7. The method of claim 1, wherein the response specifies at least one recommended compatible application.

8. The method of claim 1, wherein a device version profile includes a set of physical components of a configurable hardware platform, and wherein the response specifies at least one recommended compatible physical device component.

9. The method of claim 1, wherein the component version query request includes a first device version profile of a first device instance.

10. The method of claim 9, wherein the first device version profile of the first device instance includes software version identifiers, at least one carrier identifier, and at least one hardware identifier.

11. The method of claim 9, wherein the results of the component version query include a set of component references compatible with the first device version profile.

12. The method of claim 1, wherein collecting component version information from a plurality of device instances further comprises periodically collecting component version information.

13. The method of claim 1, further comprising augmenting the device profile repository with component version annotation.

14. The method of claim 1, further comprising providing a collection module to a plurality of device instances, and wherein collecting the component version information from a plurality of device instances is performed by the collection module.

15. The method of claim 14, wherein the collection module is an application.

16. The method of claim 14, wherein the collection module is a development kit.

* * * * *